US005727390A

United States Patent [19]

Hartle

[11] Patent Number: 5,727,390

[45] Date of Patent: Mar. 17, 1998

[54] RE-CIRCULATING HYDRAULIC SYSTEM

[75] Inventor: Kevin John Hartle, Halesowen, United Kingdom

[73] Assignee: Trinova Limited, Hampshire, United Kingdom

[21] Appl. No.: 620,905

[22] Filed: Mar. 25, 1996

[30] Foreign Application Priority Data

Mar. 31, 1995 [GB] United Kingdom .................... 9506654

[51] Int. Cl.[6] .......................................... B60T 13/20

[52] U.S. Cl. .......................................... 60/453; 60/329

[58] Field of Search .................................. 60/329, 453

[56] References Cited

U.S. PATENT DOCUMENTS

| | | | |
|---|---|---|---|
| 2,962,863 | 12/1960 | Caroli | 60/453 |
| 4,203,287 | 5/1980 | Bennett | 60/329 |
| 4,385,909 | 5/1983 | Starr . | |
| 4,456,456 | 6/1984 | Pompei . | |
| 4,685,293 | 8/1987 | McBeth . | |
| 5,020,326 | 6/1991 | Barker . | |

FOREIGN PATENT DOCUMENTS

| | | |
|---|---|---|
| 281052 | 9/1988 | European Pat. Off. . |
| 868125 | 5/1961 | United Kingdom . |
| 918221 | 2/1963 | United Kingdom . |
| 1282381 | 7/1992 | United Kingdom . |
| WO9221559 | 12/1992 | WIPO . |

*Primary Examiner*—F. Daniel Lopez
*Attorney, Agent, or Firm*—Barnes, Kisselle, Raisch, Choate, Whittemore & Hulbert

[57] ABSTRACT

A hydraulic system including a re-circulation flow loop including a hydraulic pump and an actuator in fluid communication via a high pressure feed line and a low pressure return line, the system further including an air separator in fluid communication with the low pressure line for removing air from hydraulic fluid flowing along said re-circulation loop.

15 Claims, 3 Drawing Sheets

RE-CIRCULATING HYDRAULIC SYSTEM

The present invention relates to re-circulating hydraulic systems and more particularly to a reservoirless re-circulating hydraulic system where removal of air from the circulating fluid is necessary.

Traditional re-circulating hydraulic systems such as power steering systems for motor vehicles consist of a fluid reservoir that provides fluid via a lower pressure supply hose to a pump. The pump pressurises the fluid and feeds it to an actuator, such as a steering rack, through a high pressure hose assembly. The displaced fluid from the actuator returns to the reservoir via a low pressure return line.

The reservoir has a variety of functions. It provides a serviceable means of charging the system with fresh fluid. It also holds excess fluid created from thermal changes and provides a means of allowing any air to separate out of the fluid whilst resident in the reservoir.

The use of a reservoir is however undesirable in certain circumstances, for example a reservoir occupies a relatively large amount of space and also necessitates the use of a relatively large amount of fluid. A reservoir cannot normally be hermetically sealed.

It is a general aim of the present invention to provide a re-circulating hydraulic system which avoids the use of a conventional reservoir.

According to one aspect of the present invention there is provided a hydraulic system including a re-circulation flow loop including a hydraulic pump and an actuator in fluid communication via a high pressure feed line and a low pressure return line, the system further including a variable volume container in fluid communication with the low pressure return line so as to define a volume buffer to accommodate for increases or decreases in the volume of hydraulic fluid within the system.

According to another aspect of the invention there is provided a hydraulic system including a re-circulation flow loop including a hydraulic pump and an actuator in fluid communication via a high pressure feed line and a low pressure return line, the system further including an air separator in fluid communication with the low pressure line for removing air from hydraulic fluid flowing along said re-circulation loop.

According to another aspect of the invention there is provided an air separator for a hydraulic system, the separator including a hollow body having an inlet port through which hydraulic fluid enters the body and an outlet port through which hydraulic fluid exits the body, flow diversion means located within the body for diverting a portion of the fluid flowing between said inlet and outlet ports, the diversion means creating a separate flow path whereby said portion of fluid flows to an air removal region within the body and then re-joins the fluid flowing between said inlet and outlet ports, the body further including a fluid communication port communicating with said air removal region to permit air separated from the hydraulic fluid to exit from said body.

Various aspects of the present invention are hereinafter described with reference to the accompanying drawings, in which FIG. 1 is a schematic layout of a hydraulic system according to the present invention;

FIG. 2 is an enlarged schematic section of part of the system as viewed along line II—II in FIG. 1;

FIGS. 3*a*, *b* & *c* are views taken along line III—III in FIG. 1 showing different cross-sectional shapes adopted by the variable volume containers;

Figure 1:
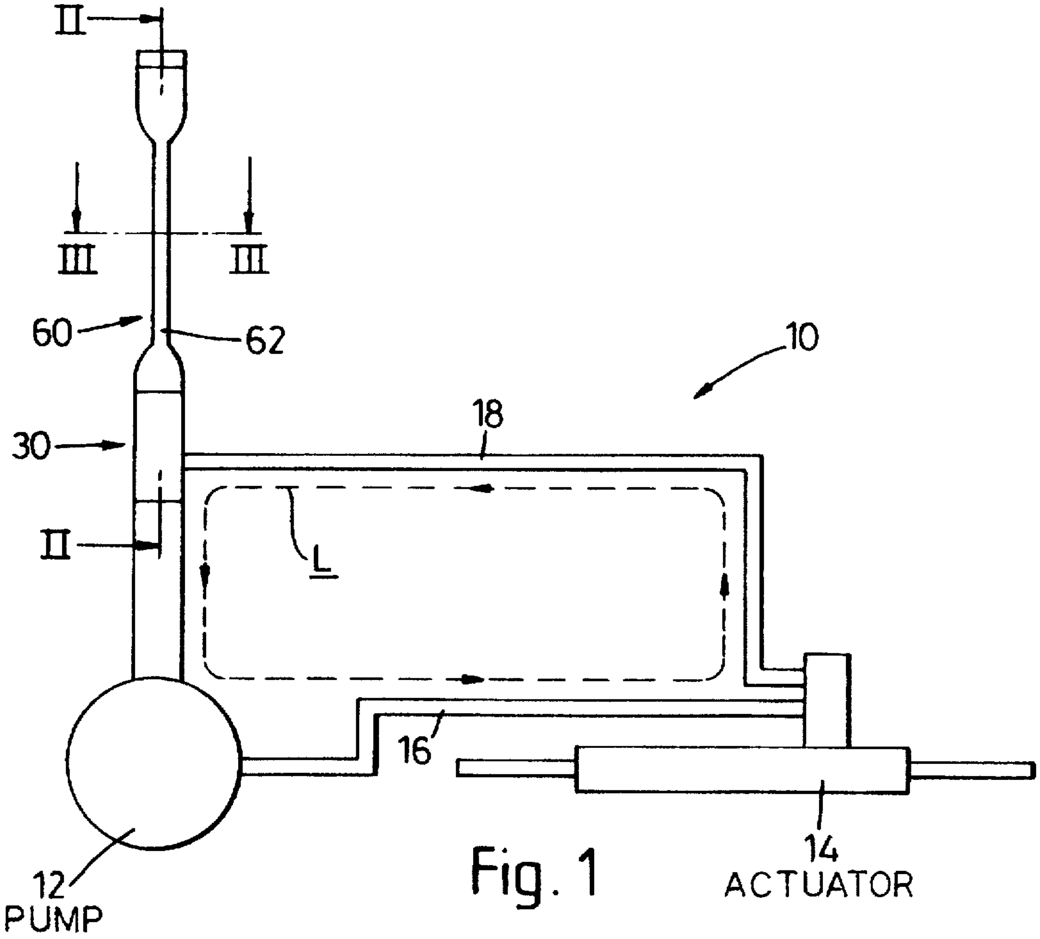

Referring initially to FIG. 1 there is shown a re-circulating hydraulic system 10 according to the invention.

The system 10 includes a hydraulic pump 12, an actuator 14, a high pressure feed line 16 and a low pressure return line 18.

The low pressure return line 18 provides direct fluid communication between an outlet from the actuator 14 and an inlet of the pump 12; the high pressure feed line 16 provides direct fluid communication between an outlet of the pump 12 and inlet of the actuator 14. Accordingly pump 12, actuator 14 and lines 16, 18 define a re-circulating path or loop L (shown diagrammatically in FIG. 1).

An air separator 30 is located within the line 18 and acts to remove air from the hydraulic fluid as it is re-circulated around loop L by pump 12.

The air separator 30 includes a cylindrical hollow body 31, a fluid inlet port 32 through which fluid enters from an upstream portion of line 18, an outlet port 33 located at the bottom axial end of the body 31 through which fluid exits along a downstream portion of line 18 to the pump 12. The body 31 also includes a fluid communication port 34 located at the upper axial end of the body 31. The re-circulating flow along path L created by the pump 12 causes fluid to enter port 32 of the separator body 31 and exit through port 33.

Figure 2:
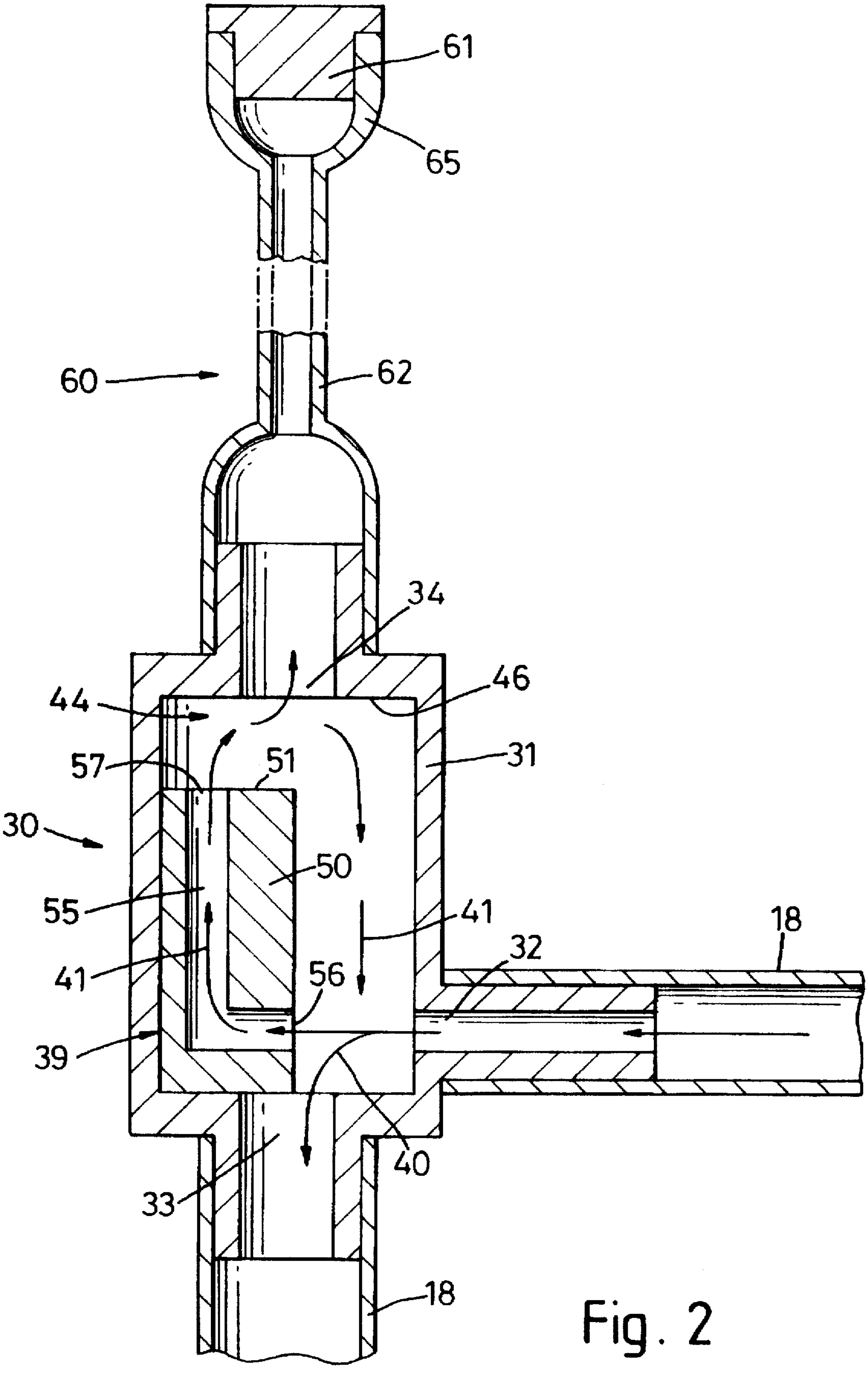
Figure 4:
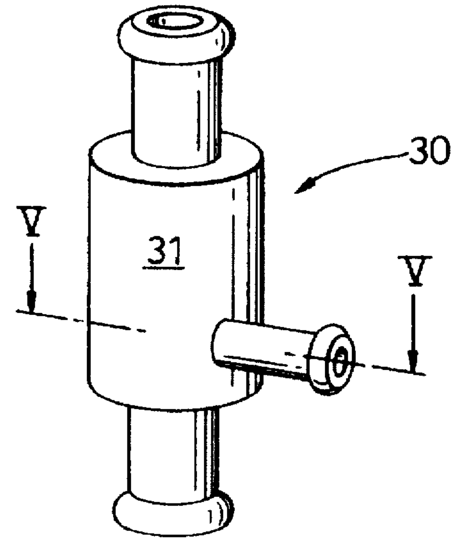
FIG. 4 is a schematic perspective view of an air separator according to the present invention.
Figure 5:
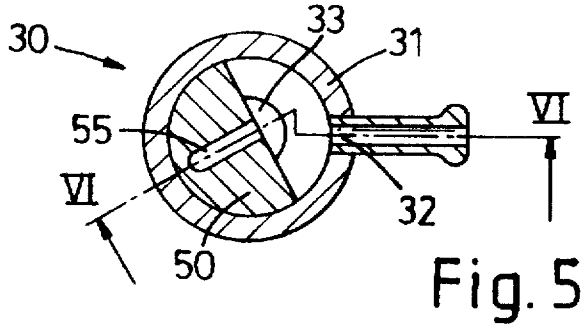
FIG. 5 is a sectional view taken along line V—V in FIGS. 4 and 6.
Figure 6:
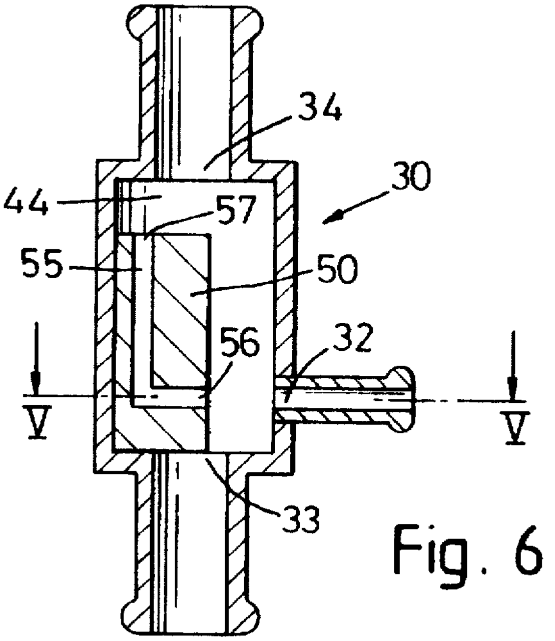
FIG. 6 is a sectional view taken along line VI—VI in FIG. 5.

A flow diversion means 39 is located within body 31 and serves the purpose of dividing the flow path of fluid flowing between ports 32 and 33 so as to create a primary flow path 40 (FIG. 2) and a secondary flow path 41. Fluid flowing along flow path 40 flows directly from port 32 to port 33 whereas fluid flowing along flow path 41 is caused to flow to the upper region 44 of the body 31 before flowing downwardly and exiting through port 33.

Air is encouraged to separate out of fluid contained primarily within the upper region 44 of the body 31 and then exit through port 34. Separating out of the air in region 44 is encouraged by preferably ensuring that a sufficiently great amount of fluid flows along path 40 to create a negative pressure within the upper region 44 and preferably providing a relatively slow velocity of flow of fluid through the upper region 44 so as to increase the resident time of fluid in the upper region 44. This is achieved in the illustrated embodiment by virtue of the flow diversion means 39 including a solid body 50 of semi-circular cross-section which extends upwardly from the bottom axial end of the hollow body 31 and which has an upper axial end 51 spaced from the upper axial end 46 of the body 31 to define region 44.

A bore 55 is formed in body 50 and has in inlet port 56 opposed to port 32 and an outlet port 57 communicating with region 44. Thus as fluid flows into body 31 through port 32 a portion of the fluid impinges upon port 56 and is caused to flow along bore 55 and create the secondary flow path 41. Fluid exiting from port 57 enters the much larger region 44 and so expands and its velocity of flow substantially reduces. These effects, coupled with the negative pressure generated by the fluid flow 40, encourages air dissolved in the fluid to separate out in region 44.

Fluid exiting region 44 flows downwardly between the body 50 and internal wall of hollow body 31 to exit out of port 33. The cross-sectional area and/or of port 56 directly facing port 32 primarily determines the proportion of fluid flowing along path 41 and thereby enable the proportion of fluid being diverted along path 41 to be adjusted by suitable choice of the relative shapes and/or cross-sectional areas of ports 32, 56. In the embodiment illustrated, the port 56 is circular and of the same diameter as port 32. However port 56 is located such that its axis is inclined relative to the axis of port 32 and thereby presents an elliptical cross-sectional shape of reduced area to port 32. The degree of inclination (achieved by the relative rotational position of body 50 within body 31) of port 56 is chosen to provide the desired proportion of flow along path 41. It is envisaged that the axes of ports 32 and 56 may however be co-axial and that the port 56 may be circular or differently shaped to port 32 and/or be of a different cross-sectional area to port 32.

It will be appreciated however that the flow diversion means 40 may be differently shaped or constructed and still achieve the desired function.

Port 34 communicates with a fluid container 60. The container 60 provides a conduit through which hydraulic fluid can be introduced into the re-circulating path or loop L when initially charging the system. The amount of hydraulic fluid introduced is sufficient to fill the entire re-circulating loop L and separator 39 and preferably completely fill the container 60. After charging of the system, the container 60 is preferably hermetically sealed by a cap 61.

The container 60 is constructed so as to vary its internal volume in response to volume changes in the hydraulic fluid contained within the system, caused for example by thermal expansion/contraction. The container 60 therefore functions as a volume buffer for hydraulic fluid contained within the system. The container preferably also arranges to temporarily provide a source of excess fluid for supply to the re-circulating loop L in order to prevent cavitation of the pump.

Figure 3A:
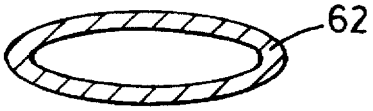

Preferably, as illustrated, the container 60 is in the form of a flexible walled tube 62 which normally has a cross-sectional shape as illustrated in FIG. 3*a*.

Figure 3B:
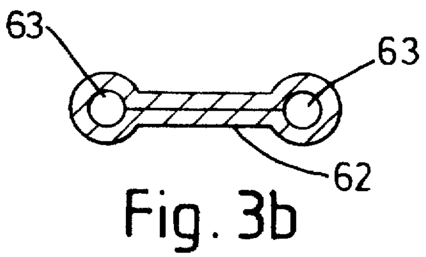
Figure 3C:
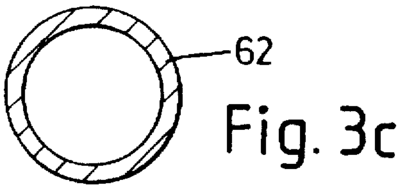

Should the volume of hydraulic fluid in the system increase, then the tube 62 will expand and eventually attain a circular cross-section as illustrated in FIG. 3*c*. The construction of the tube 62 is chosen such that expansion of the tube 62 to its circular configuration is a result of a change of shape of the tube wall and not a stretching of the tube wall material. This enables the increase in volume to be achieved without excessive back pressures being generated in the fluid.

Should the volume of hydraulic fluid in the system decrease, or fluid be drawn from the container in order to meet a temporary demand from pump 12, then the tube 62 will collapse inwardly and eventually attain the cross-sectional shape illustrated in FIG. 3*b*. Preferably the tube 62 is formed during manufacture such that after total collapse one or more passageways 63 remain to maintain a fluid passageway along the tube 62. Such a passageway assists fluid to re-enter and expand the tube and also maintains a passageway along which air escaping from the air separator can pass.

Preferably the tube 62 includes an upper enlarged section 65 of circular section which is not intended to change in volume ie. it is not intended to collapse when the remainder of tube 62 collapses when accommodating a reduction in volume. The enlarged section 65 serves to collect and store air separated by separator 30.

In a typical system such as a power steering system of a vehicle, the pressures required to inflate/deflate the walls of the tube 62 are kept within acceptable tolerances so as not to affect the desired pressure characteristics of the hydraulic fluid. Accordingly for a power steering system the pressure required to inflate the tube 62 is preferably kept below about 3 bar.

A suitable container 60 may be formed from a rubber tube containing a single reinforcing layer.

Air which has escaped from the separator 31 is retained ie. trapped within the upper region of container 60.

It will be appreciated that the container 60 allows fluid to readily become drawn into the system from the flexible tube as the circulating hoses expand due to pressure. The readiness of the flexible tube 62 to collapse avoids the creation of negative pressures in the supply hose to the pump thus preventing harmful pump cavitation. The flat section (FIG. 3*a*) of the flexible tube transforms to a round section without causing stretch of the material of the tube (FIG. 3*c*) with minimal pressure as the fluid thermally expands. The ease of transformation of the flexible tube ensures that the low pressure side of the system does not become significantly pressurised. This avoids the generation of unwanted back pressures that cause a drop in system performance yet provides a small charging pressure to the pump.

It is envisaged that the cap 61 may be provided with a one-way valve to permit air to enter the container 60 so as to permit hydraulic fluid to be drawn therefrom in the event that the flexible wall of tube 62 is unable to collapse due to, for example, the wall losing its flexibility due to exposure to an extremely low temperature working environment.

It is envisaged that the separator 39 may be directly connected to the pump 12 so as to in effect dispense with line 18 between the separator and pump.

It is envisaged that as a variable volume container (of a similar construction to container 60) may be incorporated within the low pressure line 18 to form part of the re-circulation loop L. Such a container may be an alternative or an addition to the incorporation of container 60.

I claim:

1. A hydraulic system including a re-circulation flow loop including a hydraulic pump and an actuator in fluid communication via a high pressure feed line and a low pressure return line, the system further including an air separator in fluid communication with the low pressure line for removing air from hydraulic fluid flowing along said re-circulation loop, wherein the air separator includes a flow diverter that cooperates with fluid flowing through the separator for diverting a portion of such fluid and thereby (i) causing a negative pressure in a region of fluid flowing through the air separator; and (ii) causing the velocity of fluid in said region to reduce so as to promote separation of air from the fluid in said region.

2. The system set forth in claim 1 wherein said flow diverter divides fluid flow through said separator into first and second flow paths, one of which is directed by said diverter through said region.

3. A hydraulic system according to claim 2 further including a variable volume container in fluid communication with the low pressure return line so as to define a volume buffer to accommodate for increases or decreases in the volume of hydraulic fluid within the system.

4. A hydraulic system according to claim 3 wherein the variable volume container is defined by a tube having a flexible, non-stretchable wall formed to permit the volume of the tube to expand or contract in response to changes in volume of the hydraulic fluid in the system.

5. A hydraulic system according to claim 3, wherein the container is in fluid communication with the low pressure return line so as to form a portion of said re-circulation loop.

6. A hydraulic system according to claim 3, wherein the container is in fluid communication with the low pressure return line via a branch connection so as to be isolated from the re-circulation loop.

7. A hydraulic system according to claim 3 wherein the variable volume container is defined by a tube having a flexible wall formed to permit the volume of the tube to expand or contract in response to changes in volume of the hydraulic fluid in the system.

8. A hydraulic system according to claim 1, wherein the separator includes a hollow body including an inlet port through which hydraulic fluid enters the body and an outlet port through which hydraulic fluid exits the body, fluid flow between said inlet and outlet ports forming part of said re-circulation loop, said flow diverter being located within the body for diverting a portion of the fluid flowing between said inlet and outlet ports, the diverter creating a separate fluid flow path whereby said portion of fluid flows to an air removal region within the body and then re-joins the fluid flowing between said inlet and outlet ports.

9. An air separator for a hydraulic system, the separator including a hollow body having an inlet port through which hydraulic fluid enters the body and an outlet port through which hydraulic fluid exits the body, flow diversion means located within the body for diverting a portion of the fluid flowing between said inlet and outlet ports, the diversion means creating a separate flow path whereby said portion of fluid flows to an air removal region within the body and then re-joins the fluid flowing between said inlet and outlet ports, the body further including a fluid communication port communicating with said air removal region to permit air separated from the hydraulic fluid to exit from said body, said flow diversion means (i) causing a negative pressure in a region of fluid flowing through the air separator; and (ii) causing the velocity of fluid in said region to reduce.

10. A hydraulic system including a re-circulation flow loop including a hydraulic pump and an actuator in fluid communication via a high pressure feed line and a low pressure return line, the system further including an air separator in fluid communication with the low pressure line for removing air from hydraulic fluid flowing along said re-circulation loop, and a variable volume container in fluid communication with the low pressure return line so as to define a volume buffer to accommodate for increases or decreases in the volume of hydraulic fluid within the system, the separator including a hollow body including an inlet port through which hydraulic fluid enters the body and an outlet port through which hydraulic fluid exits the body, fluid flow between said inlet and outlet ports forming part of said re-circulation loop, flow diversion means located within the body for diverting a potion of the fluid flowing between said inlet and outlet ports, the diversion means creating a separate fluid flow path whereby said portion of fluid flows to an air removal region within the body and then re-joins the fluid flowing between said inlet and outlet ports.

11. A hydraulic system according to claim 10 wherein said variable volume container is connected to said separator such that hydraulic fluid contained within the container is able to flow into and out of the re-circulation loop via the separator.

12. A hydraulic system including a re-circulation flow loop including a hydraulic pump and an actuator in fluid communication via a high pressure feed line and a low pressure return line, the system further including an air separator in fluid communication with the low pressure line for removing air from hydraulic fluid flowing along said re-circulation loop, wherein the air separator includes a flow diverter for (i) causing a negative pressure in a region of fluid flowing through the air separator; and (ii) causing the velocity of fluid in said region to reduce, and a variable volume container in fluid communication with the low pressure return line so as to define a volume buffer to accommodate for increases or decreases in the volume of hydraulic fluid within the system, the container being in fluid communication with the low pressure return line via a branch connection so as to be isolated from the re-circulation loop.

13. A hydraulic system according to claim 12 wherein the branch connection is defined by said air separator.

14. A hydraulic system including a re-circulation flow loop including a hydraulic pump and an actuator in fluid communication via a high pressure feed line and a low pressure return line, the system further including an air separator in fluid communication with the low pressure line for removing air from hydraulic fluid flowing along said re-circulation loop, wherein the air separator includes a flow diverter for (i) causing a negative pressure in a region of fluid flowing through the air separator; and (ii) causing the velocity of fluid in said region to reduce, said separator comprising a hollow body including an inlet port through which hydraulic fluid enters the body and an outlet port through which hydraulic fluid exits the body, fluid flow between said inlet and outlet ports forming part of said re-circulation loop, said flow diverter being located within the body for diverting a portion of the fluid flowing between said inlet and outlet ports, the diverter creating a separate fluid flow path whereby said portion of fluid flows to an air removal region within the body and then re-joins the fluid flowing between said inlet and outlet ports.

15. A hydraulic system according to claim 14 wherein the body includes a fluid communication port communicating with said air removal region and through which air separated from the hydraulic fluid exits from the body.

* * * * *